United States Patent [19]

Dinsmore et al.

[11] Patent Number: 4,462,811

[45] Date of Patent: Jul. 31, 1984

[54] PROCESS AND APPARATUS FOR REMOVING HYDROCARBONS FROM AIR-HYDROCARBON VAPOR MIXTURES

[75] Inventors: Harold L. Dinsmore, Tulsa; Jon W. Young, Jr., Broken Arrow, both of Okla.

[73] Assignee: John Zink Company, Tulsa, Okla.

[21] Appl. No.: 517,600

[22] Filed: Jul. 26, 1983

[51] Int. Cl.³ .................................................. B01D 53/04
[52] U.S. Cl. .................................... 55/18; 55/48; 55/51; 55/58; 55/74; 55/88; 55/162; 55/163; 55/387
[58] Field of Search ................ 55/18, 21, 48, 51, 55, 55/58, 74, 88, 161–163, 179, 180, 387

[56] References Cited

U.S. PATENT DOCUMENTS

| | | | |
|---|---|---|---|
| 3,867,111 | 2/1975 | Knowles | 55/21 |
| 3,902,874 | 9/1975 | McAndrews | 55/161 X |
| 3,979,175 | 9/1976 | Kattan et al. | 55/88 X |
| 4,039,306 | 8/1977 | Taylor | 55/179 X |
| 4,066,423 | 1/1978 | McGill et al. | 55/48 |
| 4,261,716 | 4/1981 | Schwartz et al. | 55/179 X |
| 4,276,058 | 6/1981 | Dinsmore | 55/48 |
| 4,338,101 | 7/1982 | Tuttle | 55/180 X |
| 4,343,629 | 8/1982 | Dinsmore et al. | 55/28 |
| 4,392,870 | 7/1983 | Chieffo et al. | 55/163 X |

Primary Examiner—Robert H. Spitzer
Attorney, Agent, or Firm—Neil M. Rose; Clifford A. Dean; Robert J. Fox

[57] ABSTRACT

Apparatus for recovering hydrocarbons from an air-hydrocarbon vapor mixture of the type including a pair of alternatively used carbon bed adsorbers which are used to remove hydrocarbon vapors from the mixture and which are desorbed of hydrocarbons by subjecting the beds alternatively to vacuum regeneration using a vacuum pump the output of which is passed through an absorber using liquid gasoline as the absorbent liquid. The efficiency of the process is increased by interrupting the flow of the absorbent liquid during the initial period of the regeneration during which period the hydrocarbon vapor content of the mixture is low due to the fact that a substantial vacuum is required to separate the hydrocarbons from the carbon bed.

20 Claims, 2 Drawing Figures

PROCESS AND APPARATUS FOR REMOVING HYDROCARBONS FROM AIR-HYDROCARBON VAPOR MIXTURES

BACKGROUND OF THE INVENTION

The present invention relates to a process and apparatus for recovering hydrocarbons from air-hydrocarbon vapor mixtures and, more specifically, relates to a process and apparatus for efficiently collecting and recovering gasoline vapors which are normally associated with loading facilities where gasoline is transferred at which time such vapors are generated and must be disposed of to meet the current environment regulations.

As the environmental regulations have come into being in the last decade, a market has developed for equipment which would be used at gaoline loading terminals to prevent the emission of gasoline vapors to the atmosphere. While there are a number of different approaches used commercially to collect and recover these vapors, one of the preferred approaches involves the use of activated carbon adsorber beds which are used alternatively to adsorb the hydrocarbons from the air-hydrocarbon mixture providing hydrocarbon free air which may be vented to the atmosphere. Plural beds are required so that one bed may be regenerated while the other bed is on stream performing its adsorption function.

The basic concept of using activated carbon adsorbing beds in connection with recovering gasoline vapors was known commercially through the efforts of Rheem Superior Company which sold a Mark IV gasoline vapor recovery system in the early 1970's. One such Mark IV system was purchased by Texaco Company and has been operating at Texaco's Port Arthur gasoline loading terminal since at least 1975. The Calgon Corporation has also described, in its commercial material circulated in the 1972-74 period, systems utilizing plural carbon beds for collecting gasoline vapors. Calgon described such systems in connection with literature intended to promote sale of its activated carbon for use in such adsorber beds.

The prior art teaches the use of liquid seal vacuum pumps to desorb the hydrocarbons from such beds and further the use of absorbers to collect the concentrated hydrocarbon vapors removed from the beds by the liquid seal vacuum pump. The absorber is typically supplied with liquid gasoline as the absorbent liquid. The concept of liquid seal vacuum pumps and the associated absorber was also included in the gasoline vapor recovery apparatus sold by Rheem Superior as the Mark IV and installed in Port Arthur, Texas at the Texaco gasoline loading facility.

There have been variations and improvements over the Rheem Superior Mark IV unit which was on sale and in public use prior to any of these variations or improvements being patented or otherwise made known. The U.S. Pat. to McGill et al No. 4,066,423 relates to a hydrocarbon vapor recovery system which is substantially the same as the Rheem Superior Mark IV system, as far as the carbon beds, liquid seal vacuum pumps, and three-phase separator are concerned, but it differs radically in that it utilizes recovered hydrocarbon liquid as the absorbent liquid rather than fresh gasoline from storage as was done in the Mark IV unit. The U.S. Pat. to Dinsmore No. 4,276,058 discloses a hydrocarbon vapor recovery process and apparatus very similar to the Mark IV unit in which fresh gasoline used to cool the seal liquid for the liquid seal vacuum pump is circulated to the absorber to serve as absorbent liquid. The U.S. Pat. to Dinsmore et al No. 4,343,629 also teaches the use of cooling coils associated with the carbon beds to prevent temperature rises which might damage the carbon beds on some occasions.

In all of the foregoing prior art vapor recovery systems, including the Mark IV, the overhead gas from the absorber is conventionally recycled back to the on stream carbon bed to separate the remaining hydrocarbon vapors from the air with which they are mixed. It is important that this recycled overhead gas be maintained with as low a percentage as possible of hydrocarbons so as to minimize the loading in the on stream carbon bed.

In the design of the foregoing hydrocarbon recovery systems which are, for simplicity, called adsorption/absorption systems, it is, of course, desirable to minimize the size of the carbon beds, the vacuum pump and the absorber in order to construct the equipment at the lowest cost possible. The equipment is normally subjected to substantial loads during peak periods of utilization of the loading terminal. In between times, the terminal may be relatively inactive or completely shutdown. However, there is no capacity for storage of vapors so they must be processed continuously during the peak periods. The equipment typically operates on a cycle of approximately 15 minutes during which one carbon bed functions as an adsorber while the other carbon bed is being regenerated by the liquid seal vacuum pump. At the end of the 15 minute cycle, the regeneration of the one bed has been completed and, if the design capacity of the equipment is sufficient, the on stream bed will still have some limited capacity and will still be satisfactorily removing the hydrocarbons from the air-hydrocarbon mixture. When the beds are switched, the regenerated bed then becomes the on stream bed and the other is subjected to the regeneration or desorption process. In all of the commercially available adsorption/absorption hydrocarbon vapor recovery systems, the absorber is operated continuously as long as the vacuum pump is running.

In the initial Rheem Superior Mark IV hydrocarbon vapor recovery equipment, there had been an attempt to reduce the hydrocarbon content of the absorber overhead gas by terminating the flow of the gasoline hydrocarbon absorbent liquid for a very short time during the very end of the regeneration period, at which time purge air was being passed through the bed being regenerated. The theory behind this concept was that once the hydrocarbons were substantially removed from the bed being regenerated, there might be more air than hydrocarbons passing through the absorber causing the mixture to actually strip hydrocarbons from the absorbent liquid thereby producing an overhead gas having a higher percentage of hydrocarbons than the mixture delivered to the absorber. Therefore, Rheem Superior had proposed that the flow of gasoline absorbent liquid be terminated toward the end of the regeneration cycle so that such stripping would not occur and so that the overhead gas recycled to the on carbon bed would have a lower hydrocarbon content.

It is further noted that the U.S. Pat. to McGill et al No. 4,066,423 teaches the concept of maintaining a constant composition absorber overhead gas, as was true of most absorbers used for hydrocarbon vapor recovery. The present invention involves a process and apparatus in which the composition of the overhead gas is not maintained constant but is varied considerably in order to improve the efficiency of the system. By terminating the flow of the absorbent liquid at the initial portion of the regeneration cycle, it is possible to substantially decrease the hydrocarbons recycled to the on stream carbon bed.

SUMMARY OF THE INVENTION

The present invention provides an improved process and apparatus for recovering hydrocarbons from an air-hydrocarbon mixture in a more efficient manner than was heretofore known in the art. During the early portion of the regeneration cycle, the vacuum pump removes principally air from the piping and interstices between the carbon particles and removes very little hydrocarbon vapor. It is not until the vacuum level within the adsorption bed reaches approximately 15 inches of mercury that the separation of the hydrocarbons from the activated carbon begins to occur. The process of the invention involves discontinuing the flow of absorbent liquid to the absorber during this period in which the level of hydrocarbon vapors in the air-hydrocarbon mixture is lower than that which would normally be found in the overhead gas. Thus, during this period before the hydrocarbons begin to be separated from the activated carbon, the air may be circulated through the absorber and directly to the on carbon bed maintaining a lower percentage of hydrocarbon vapor to air than would exist if the absorbent liquid were flowing during that period.

The invention contemplates the use of control valves to obstruct flow of the absorbent liquid from initiation of the regeneration cycle until such time as the vacuum level within the absorber beds reaches approximately 15 inches of mercury vacuum. It should be understood that the concept of the invention is applicable to the separation of vapor other than the light components of gasoline as encountered in gasoline loading terminals and could be used in connection with other chemical vapors. However, the vacuum level at which the absorber liquid would be restarted would depend upon the characteristics of the vapor and the bed and the affinity of the material to the adsorber bed and the degree of vacuum required to achieve the separation. It should also be appreciated that control of such a process may be on a timed basis once it has been established how long it takes to reach the critical vacuum level in a given process or piece of equipment. Thus, if it takes two and a half minutes to achieve 15 inches of mercury vacuum in a gasoline vapor unit, the interruption of flow of absorbent liquid could be timed rather than controlled by a vacuum responsive means.

It is, therefore, an object of the present invention to provide an improved process and apparatus for recovering hydrocarbon vapors from an air-hydrocarbon mixture.

It is another object of the present invention to provide a more efficient process and apparatus for recovering hydrocarbon vapors through the use of an adsorption/absorption system in which the composition of the overhead gas in the absorber is caused to vary to reduce the amount of recycled hydrocarbon vapor.

It is another object of the present invention to provide an improved process and apparatus for recovering hydrocarbon vapors in an adsorption/absorption system in which the flow of absorbent to the absorber is discontinued during the initial portion of the regeneration cycle to eliminate any stripping of hydrocarbons by the mixture passing therethrough.

Further objects and advantages will become apparent as the following description proceeds and the features of novelty which characterize the invention will be pointed out in the claims annexed to and forming a part of the specification.

DESCRIPTION OF THE PREFERRED EMBODIMENT

Figure 1:
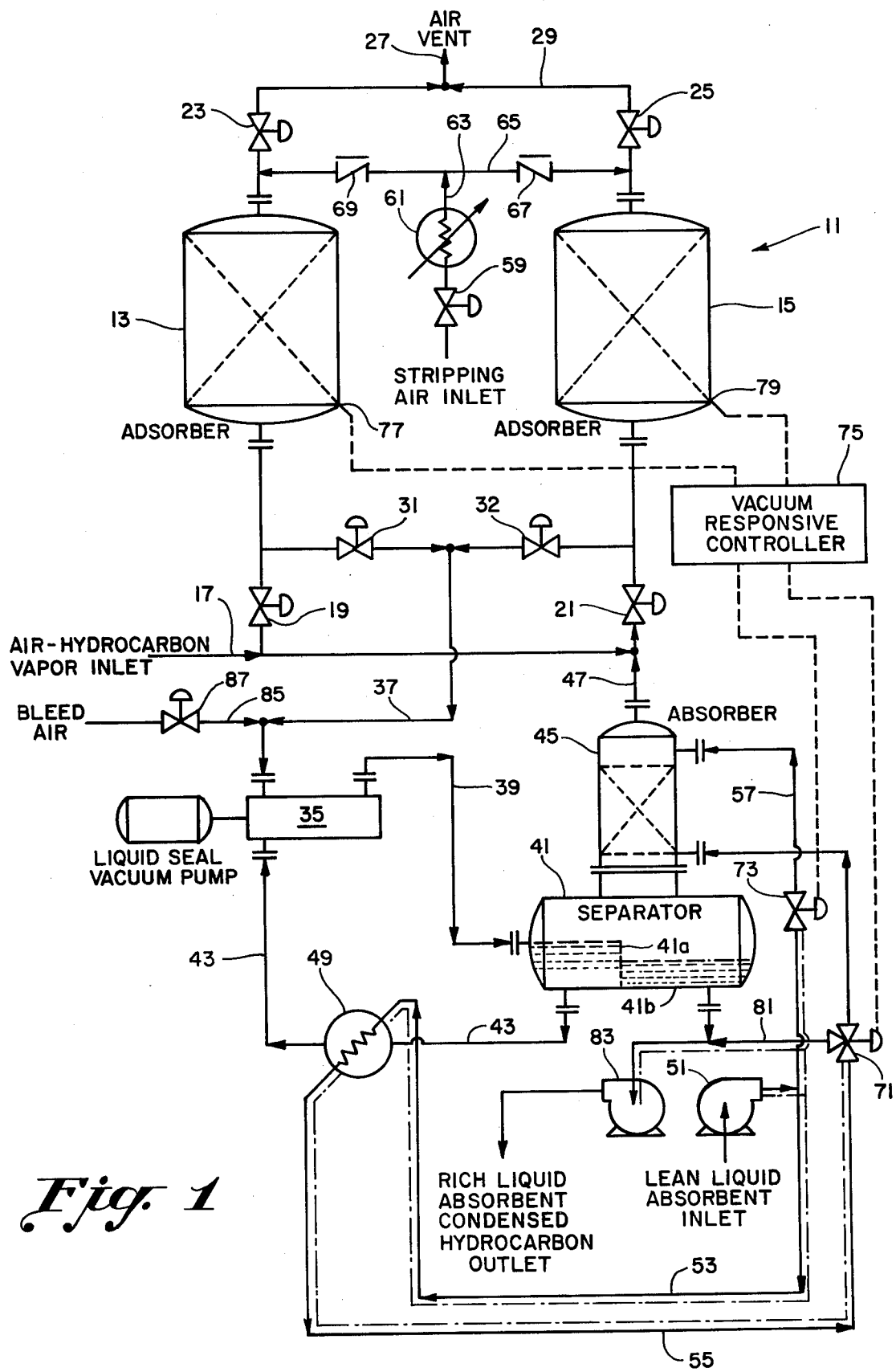
FIG. 1 is a diagrammatic illustration of a preferred form of the apparatus.

Referring to the drawings, there is shown in FIG. 1 a diagrammatic illustration of an apparatus designated generally by reference numeral 11 which is usable to recover hydrocarbon or gasoline vapors of the type commonly generated in connection with gasoline loading terminals. The apparatus 11 includes a pair of adsorbers 13 and 15 which are filled with activated carbon particles and serve to adsorb gasoline vapors.

As illustrated in the diagram, a flow line 17 is provided which receives the vapor inlet to the equipment 11, the inlet vapor comprising an air-hydrocarbon vapor mixture normally received or collected from a gasoline loading terminal or the like facility. The line 17 may be selectively connected to either of the adsorbers 13, 15 depending on which of the motor operated values 19 and 21 are actuated to their open position. At the outlet of the adsorbers 13 and 15, there are additional motor operated valves 23 and 25 which permit communication from the adsorbers 13 and 15 to an air outlet vent 27 through a connecting pipe 29.

If adsorber 13 is on line and adsorbing gasoline vapors, the valves 19 and 23 would be opened permitting the air-hydrocarbon vapor mixture to pass upwardly therethrough and out the vent 27 with the hydrocarbon vapors being adsorbed by the activated carbon in the adsorber 13. Also associated with the adsorbers 13 and 15 are motor operated valves 31 and 32 which are used during regeneration and when the adsorber 13 is on line receiving vapors through line 17, valve 31 would be in its closed position.

While the adsorber 13 is on line, the adsorber 15 is being regenerated. The regeneration is accomplished by means of a liquid seal vacuum pump 35 which is connected by line 37 to the valves 31 and 32. When the adsorber 15 is being regenerated, the valve 25 at the top of adsorber 15 is closed as is the valve 21 at the bottom of the adsorber 15 while the valve 32 is opened permitting the vacuum pump to exhaust air and vapor from the adsorber 15. The outlet of the liquid seal vacuum pump 35 is fed through a line 39 to a separator 41. The separator 41 is conventionally used with a liquid seal vacuum pump to provide a three-phase separation with the vacuum pump seal fluid being separated and returned to the pump through a line 43 while the condensed gasoline, being of a lower specific gravity than the seal liquid, floats to the top and passes over the weir 41a and is deposited in the sump 41b, which comprises the right end of the separator 41.

The hydrocarbon vapor then passes upwardly to an absorber 45. The absorber 45 is conventional in form having an outlet 47 at its upper end which interconnects with the inlet line 17 in order to supply the overhead gas from the absorber 45 to whichever of the adsorber beds 13 or 15 is on line at the time. The absorber 45 is a column which is packed with pall rings or some other means of dispersing the absorbent liquid and causing it to be contacted by countercurrent flow of the stream of vapor moving upwardly therethrough.

In order to cool the seal fluid used in the liquid seal vacuum pump, there is a heat exchanger 49 provided in the line 43 conducting the seal fluid from the separator 41 back to the pump 35. The cooling of the seal fluid in the heat exchanger 49 is accomplished by means of gasoline from storage which is circulated by a pump 51 through a line 53 through the heat exchanger 49 to a line 55 which connects to the lower part of the absorber 45. There is also a second line 57 which feeds absorbent fluid to the top of the absorber 45. The line 57 to the top of the absorber 45 is connected to the pump 51 which supplies lean liquid absorbent or gasoline from storage. Thus, during the regeneration cycle, the vacuum pump 35 reduces the pressure within the adsorber bed being regenerated, in our example, adsorber 15, with the output of the vacuum pump being delivered to the separator 41 where the seal liquid, the condensed gasoline and the hydrocarbon vapors are separated. The hydrocarbon vapor and air pass upwardly through the absorber 45 through the outlet 47 and back through valve 19 to the on stream carbon bed 13.

As is conventional in adsorption/absorption systems, a means to provide stripping air at the end of the regeneration cycle is provided. It comprises a valve 59, an air heater 61, connecting lines 63, 65 and check valves 67, 69. Thus, the valve 59 may be opened and to the vacuum within the bed being regenerated which causes a metered amount of heated air to be injected into the carbon bed to facilitate the more complete removal of the hydrocarbons deposited therein. The heating of the purge air is optional to enhance its effectiveness. However, for various reasons, it is often preferred to use unheated purge air.

The system described thus far is in accordance with the prior art as described in the U.S. Pat. No. 4,276,058. In order to improve the efficiency of the adsorption/absorption system 11, we have recognized the fact that improved efficiency can be obtained if the overhead gas composition in the absorber 45 is deliberately prevented from remaining constant but is reduced, when possible, during the regeneration process. During the initial stage of the pump down of the adsorber during regeneration, there is a period of time in which the vacuum pump is simply removing air found in the piping and in the interstices between the particles of carbon and residual small amounts of hydrocarbon vapor that has not been adsorbed by the carbon but is only present in the piping. It is not until there is a substantial vacuum created that the bond between the adsorbed hydrocarbon molecules and the carbon particles can be broken or separated in order to permit the hydrocarbons to flow from the adsorber bed. During this period of this regeneration cycle, there may be some hydrocarbons carried through the system but the percentage is considerably less than that which occurs after the necessary vacuum has been achieved in the bed. It has been found, therefore, that until the vacuum in the bed reaches approximately 15 inches of mercury vacuum, it is advantageous to circulate the mixture of air and hydrocarbons directly back to the on stream carbon bed without subjecting it to the absorption process. If the absorber is functioning in its normal manner, the mixture with predominantly air as compared to hydrocarbons will actually strip more hydrocarbon from the absorber and increase its percentage as it passes from line 39 to the separator 41 through the absorber 45 to the outlet 47.

To overcome this problem, there are provided motor operated valves 71 and 73 which are positioned in the lines 55 and 57, respectively. The valves 71 and 73 are controlled by a controller 75 which includes vacuum sensors 77 and 79 associated with adsorbers 13 and 15, respectively. The valves are controlled so that upon initiation of the regeneration cycle, the valves 71 and 73 are actuated to prevent flow of absorbent liquid or gasoline to the absorber 45.

The valve 71 is constructed to have a by-pass 81 so that when the valve 71 is in its actuated position, the liquid through the line 55 is delivered through the line 81 to a return pump 83 which serves to circulate the gasoline from the sump of the separator 41 as well as the returned hydrocarbon seal coolant liquid back to the gasoline storage. When the vacuum within the adsorber, as sensed by the sensors 77 or 79, reaches approximately 15 inches of mercury vacuum, the controller 75 responds to actuate the valves 71 and 73 permitting the absorbent liquid to flow to the absorber 45. Such flow of liquid continues through the remainder of the regeneration cycle and is terminated only when the beds switch to begin a new regeneration cycle.

As mentioned above, it is contemplated that the period of interruption of the flow of absorbent liquid may be for a timed interval rather than in response to achieving the desired level of vacuum in the adsorber bed being regenerated. Because of the fact that the regeneration process for a particular piece of equipment is substantially the same each cycle, once the time has been established for the pump down of the bed to the desired vacuum level, that time period can be used thereafter to control the period for which the absorbent flow is terminated.

Figure 2:
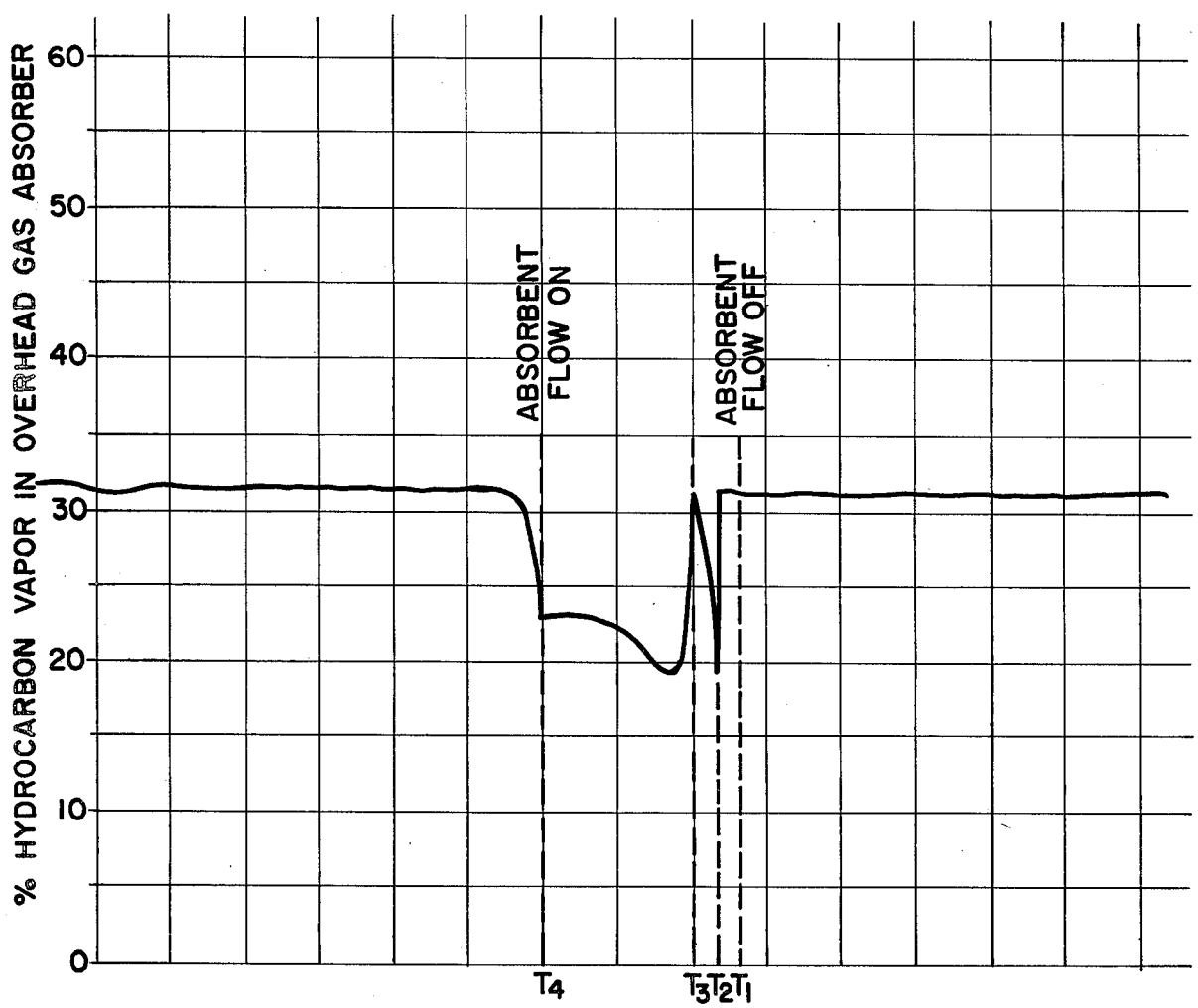
FIG. 2 is a graph showing the percentage hydrocarbons in the overhead gas of the adsorber plotted against time.

To better understand the manner in which the discontinuance of the absorbent fluid effects the overhead gas composition, reference should be had to FIG. 2 which represents a plot by a continuous recording instrument of the percentage hydrocarbons in the overhead gas against time. At the time T-1, the regeneration process begins and the flow of absorbent liquid is cut off. For a short increment of time, nothing changes in the graph since there is a brief period before liquid absorbent clears itself from the column. Shortly thereafter, the percentage hydrocarbons in the overhead gas drops from on the order of 32% to less than 20%.

To understand the next peak in the graph, it is necessary to know exactly how the valves 31 and 32 sequence at the time the beds are switched from on stream to regeneration. When regeneration of bed 15, for instance is completed, valve 32 closes and the flow of absorbent liquid is interrupted. There is then a brief period before which valve 31 opens to begin regeneration of bed 13. During that period of time, to prevent cavitation in the vacuum pump 35, air must be bled into inlet line 37. This is accomplished by an air bleed line 85 controlled by a motor operated valve 87. Immediately thereafter, valve 31 is opened and evacuation of bed 13 commences.

On the graph, the period between T-1 and T-2 represents the time during which the air bleed is open through valve 87. At T-2, the air bleed closes and the valve 31 opens causing a rise in the hydrocarbon content in the overhead gas composition because of vapors and condensation in the line which are initially pulled through to the absorber causing the peak at T-3. Thereafter, the hydrocarbon content will fall rapidly to less than 20% after which it will rise gradually until time T-4 at which the vacuum achieved in the adsorbent bed reaches 15 inches of mercury vacuum and the flow of absorbent liquid was reinstituted. Shortly thereafter, the overhead gas composition returned to the level of between 31% and 32% where it continued until the termination of the regeneration cycle. This graph makes it obvious that during the period from T-1 to T-4, the hydrocarbon content of the overhead gas is reduced considerably under normal circumstances.

In a typical commercial installation utilizing carbon beds cycled at fifteen minute intervals, the period of interruption of the flow of absorbent liquid would be on the order of 1½ to 2 minutes depending on the size of the beds, the size of the vacuum pumps and the other parameters of the system. In periods of heavy loading of the carbon beds, the reduction in the hydrocarbon vapor content in the recycled overhead gas will provide a significant improvement in the efficiency of the overall system.

What is claimed as new and desired to be secured by Letters Patent of the United States is:

1. In a process for recovering hydrocarbons from an air-hydrocarbon vapor mixture, the steps comprising:
   (a) passing an air-hydrocarbon vapor mixture through a first carbon bed which adsorbs the hydrocarbons, permitting substantially hydrocarbon free air to be vented to the atmosphere;
   (b) subjecting a second carbon bed to a vacuum condition by means of a vacuum pump, to regenerate said second carbon bed by desorbing hydrocarbons which have previously been adsorbed thereby;
   (c) circulating the air-hydrocarbon vapor mixture exhausted from said second carbon bed to an absorber having means for providing an absorbent liquid through which said air-hydrocarbon vapor mixture is passed to absorb a portion of the hydrocarbon vapor;
   (d) returning the air-hydrocarbon vapor mixture from the output of said absorber to said first carbon bed;
   (e) periodically switching said first and second carbon beds whereby said second carbon bed receives said air-hydrocarbon vapor mixture and said first carbon bed is regenerated by desorbing hydrocarbons previously adsorbed therein;
   (f) circulating said absorbent liquid through said absorber during the cycles of alternately desorbing said first and second carbon beds; and
   (g) interrupting said circulation of absorbent periodically during the initial period of the desorption of each carbon bed until the level of hydrocarbon content in the air-hydrocarbon vapor exhausted from said each carbon bed is sufficiently high to be at least partially absorbed in said absorber.

2. The process of claim 1 wherein the periodic switching of said first and second beds is performed on a timed cycle with each carbon bed being regenerated for a predetermined time period.

3. The process of claim 2 wherein said periodic interruption of said circulation of said absorbent liquid is initiated at the beginning of each regeneration cycle and circulation is restarted when the vacuum level in the carbon bed being regenerated is approximately 15 inches of mercury vacuum.

4. The process of claim 3 wherein said vacuum pump is a liquid seal pump having a heat exchange in which the seal liquid for said pump is cooled by liquid gasoline, said absorbent liquid being gasoline which is circulated through said absorber by a liquid pump which also circulates liquid gasoline to said heat exchanger, said interruption of the circulation of said absorbent liquid being accomplished by blocking flow to said absorber while continuing to pump gasoline through said heat exchanger.

5. The process of claim 2 wherein said periodic interruption of said circulation of said absorbent is initiated at the beginning of each regeneration cycle and circulation is restarted after a predetermined time permitting the vacuum pump to attain a vacuum of approximately 15 inches of mercury vacuum.

6. The process of claim 1 wherein said circulation of absorbent liquid is re-initiated only after a sufficient vacuum has been obtained to commence desorption of the hydrocarbon adsorbed by said carbon bed being desorbed.

7. In a process for recovering hydrocarbons from an air-hydrocarbon vapor mixture, the steps comprising:
   (a) passing an air-hydrocarbon vapor mixture through a first carbon bed which adsorbs the hydrocarbons, permitting substantially hydrocarbon free air to be vented to the atmosphere;
   (b) subjecting a second carbon bed to a vacuum condition by means of a vacuum pump, to regenerate said second carbon bed by desorbing hydrocarbons which have previously been adsorbed thereby;
   (c) circulating the air-hydrocarbon vapor mixture exhausted from said second carbon bed to an absorber having means for providing an absorbent liquid through which said air-hydrocarbon vapor mixture is passed to absorb a portion of the hydrocarbon vapor;
   (d) returning the air-hydrocarbon vapor overhead gas from the output of said absorber to said first carbon bed;
   (e) periodically switching said first and second carbon beds whereby said second carbon bed receives said air-hydrocarbon vapor mixture and said first carbon bed is regenerated by desorbing hydrocarbons previously adsorbed therein;
   (f) circulating said absorbent liquid through said absorber during the cycles of alternately desorbing said first and second carbon beds; and
   (g) interrupting said circulation of absorbent periodically during the initial period of the desorption of each carbon bed for a predetermined time to prevent stripping of hydrocarbons from said absorbent liquid by an air-hydrocarbon vapor mixture having a lower percentage of hydrocarbon vapor than the overhead gas in said absorber when said absorbent is being circulated.

8. The process of claim 7 wherein the periodic switching of said first and second beds is performed on a timed cycle with each carbon bed being regenerated for a predetermined time period, said periodic interruption of said circulation of said absorbent liquid being initiated at the beginning of each regeneration cycle and circulation of said absorbent liquid is restarted when the vacuum level in the carbon bed being regenerated is approximately 15 inches of mercury vacuum.

9. The process of claim 8 wherein said vacuum pump is a liquid seal pump having a heat exchanger in which the seal liquid for said pump is cooled by liquid gasoline, said absorbent liquid being gasoline which is circulated through said absorber by a liquid pump which also circulates liquid gasoline to said heat exchanger, said interruption of the circulation of said absorbent liquid being accomplished by blocking flow to said absorber while continuing to pump gasoline through said heat exchanger.

10. Apparatus for recovery of hydrocarbons from an air-hydrocarbon vapor mixture comprising means for regenerating a carbon bed used in the adsorption of hydrocarbons including an adsorber including a carbon bed, a vacuum pump connected to said adsorber to subject said carbon bed to a vacuum to desorb the hydrocarbons deposited therein, an absorber communicating with said vacuum pump to receive an air-hydrocarbon vapor mixture, said absorber including a liquid pump to circulate an absorbent liquid therethrough so that said absorbent liquid is contacted by said air-hydrocarbon vapor mixture, control means for interrupting the flow of absorbent liquid periodically in response to the vacuum level in said adsorber, said control means interrupting said flow from the time when said vacuum pump begins to exhaust said carbon bed until said pump has developed a vacuum at which said hydrocarbons in said carbon bed will begin to be separated from said carbon bed.

11. The apparatus of claim 10 wherein said vacuum level at which said absorbent liquid is commenced circulating to said absorber being on the order of 15 inches of mercury vacuum.

12. The apparatus of claim 10 wherein said control means is connected to at least one valve which blocks flow of absorbent liquid to said absorber, said vacuum pump being a liquid seal pump having a heat exchanger to cool the seal fluid used therein, said liquid pump circulating fresh gasoline to both said absorber as absorbent liquid and to said heat exchanger as a coolant, said pump operating continuously to supply gasoline to said heat exchanger.

13. The apparatus of claim 10 wherein said control means commences circulation of said absorbent liquid in a predetermined period of time after cessation of flow.

14. The apparatus of claim 11 including sensing means responsive to the vacuum levels in each of said adsorbent beds, said control means being responsive to said sensing means to commence circulation of said absorbent liquid to said absorber.

15. Apparatus for recovery of hydrocarbons from an air-hydrocarbon vapor mixture comprising means for regenerating a carbon bed used in the adsorption of hydrocarbons including an adsorber including a carbon bed, a vacuum pump connected to said adsorber to subject said carbon bed to a vacuum to desorb the hydrocarbons deposited therein, an absorber communicating with said vacuum pump, to receive an air-hydrocarbon vapor mixture, said absorber including a liquid pump to circulate an absorbent liquid therethrough so that said absorbent liquid is contacted by said air-hydrocarbon vapor mixture, control means for interrupting the flow of absorbent liquid periodically, said vacuum pump begins to exhaust said carbon bed until the hydrocarbon content of the air vapor mixture exhausted from said pump is equal to or greater than the hydrocarbon vapor content in the overhead gas of said absorber when liquid absorbent is flowing to said absorber.

16. The apparatus of claim 15 wherein said absorbent liquid is commenced circulating to said absorber when the vacuum level in said adsorber is approximately 15 inches of mercury vacuum.

17. The apparatus of claim 16 wherein said control means is connected to at least one valve which blocks flow of absorbent liquid to said absorber, said vacuum pump being a liquid seal pump having a heat exchanger to cool the seal fluid used therein, said liquid pump circulating fresh gasoline to both said absorber as absorbent liquid and to said heat exchanger as a coolant, said liquid pump operating continuously to supply gasoline to said heat exchanger.

18. The apparatus of claim 17 wherein means are provided to circulate said fresh gasoline from said heat exchanger to said absorber for use as absorbent liquid and separate conduit means to circulate fresh gasoline directly from said liquid pump to said absorber, a first valve to block flow through said separate conduit means and a second valve to divert flow of gasoline from said heat exchanger back to a gasoline storage reservoir.

19. The apparatus of claim 15 wherein said control means commences circulation of said absorbent liquid in a predetermined period of time after cessation of flow.

20. The apparatus of claim 16 including sensing means responsive to the vacuum levels in each of said adsorbent beds, said control means being responsive to said sensing means to commence circulation of said absorbent liquid to said absorber.

* * * * *